No. 828,538. PATENTED AUG. 14, 1906.
C. E. DAVIS.
PHOTOGRAPHIC CAMERA.
APPLICATION FILED JUNE 30, 1903.
4 SHEETS—SHEET 1.
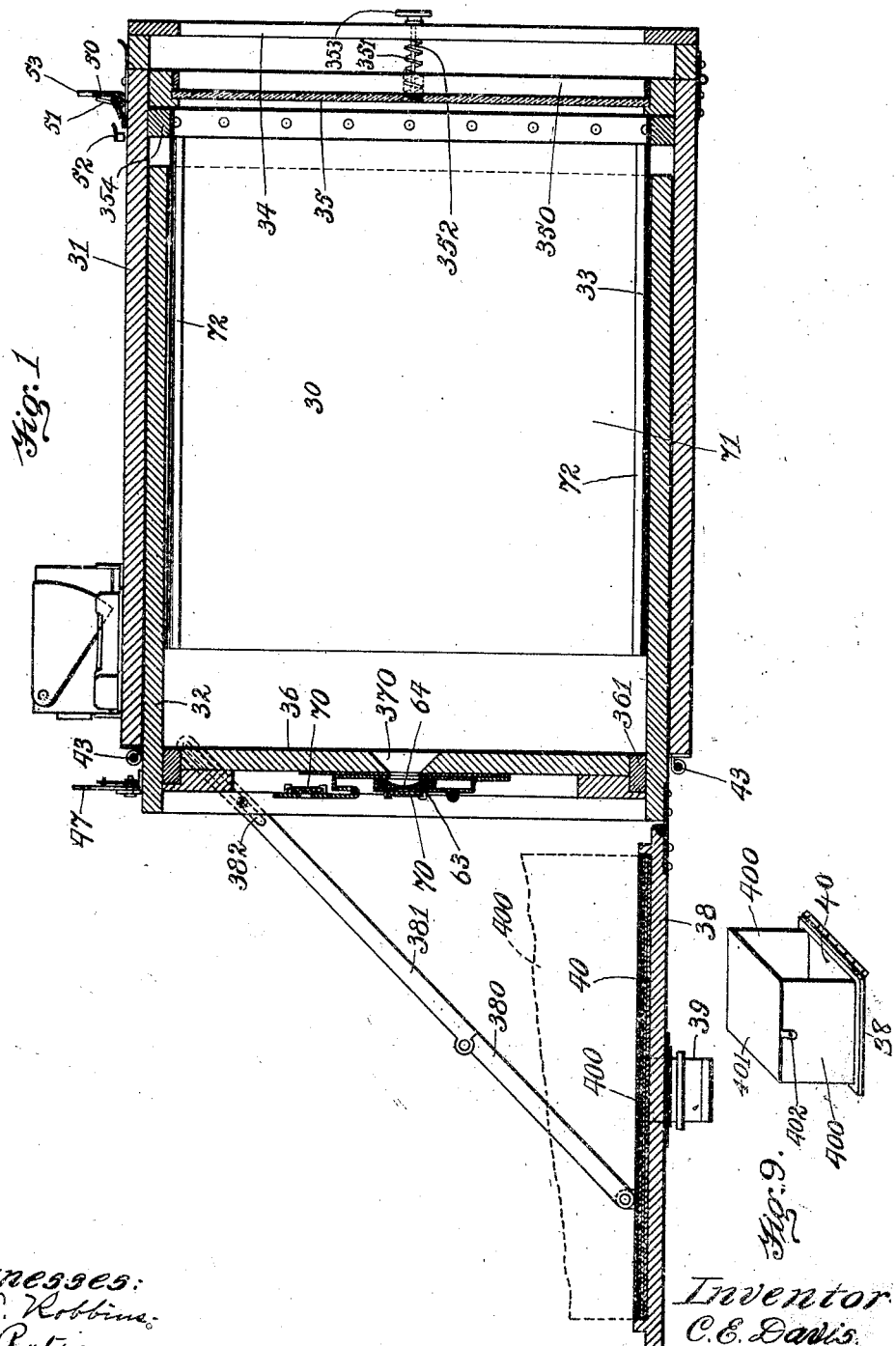
Witnesses:
H. L. Robbins.
A. C. Ratigan
Inventor
C. E. Davis.
by Wright, Brown & Quinby
Attys.

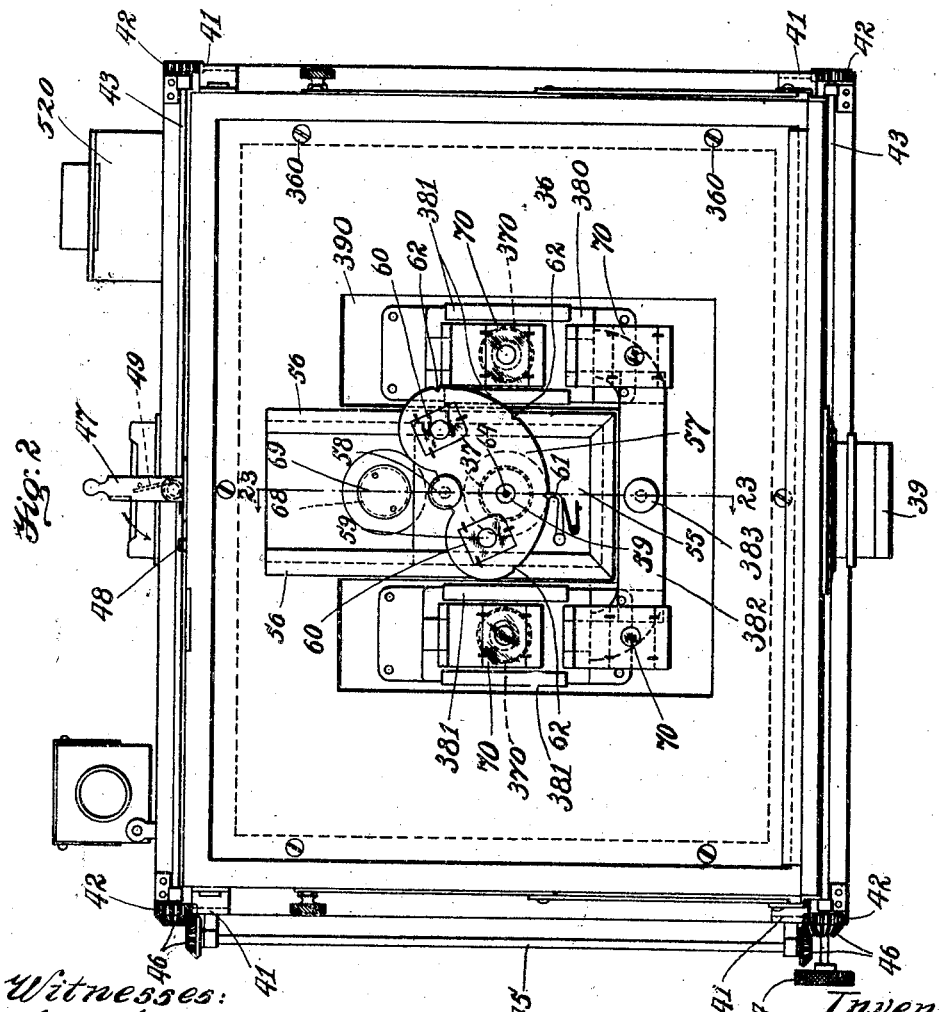

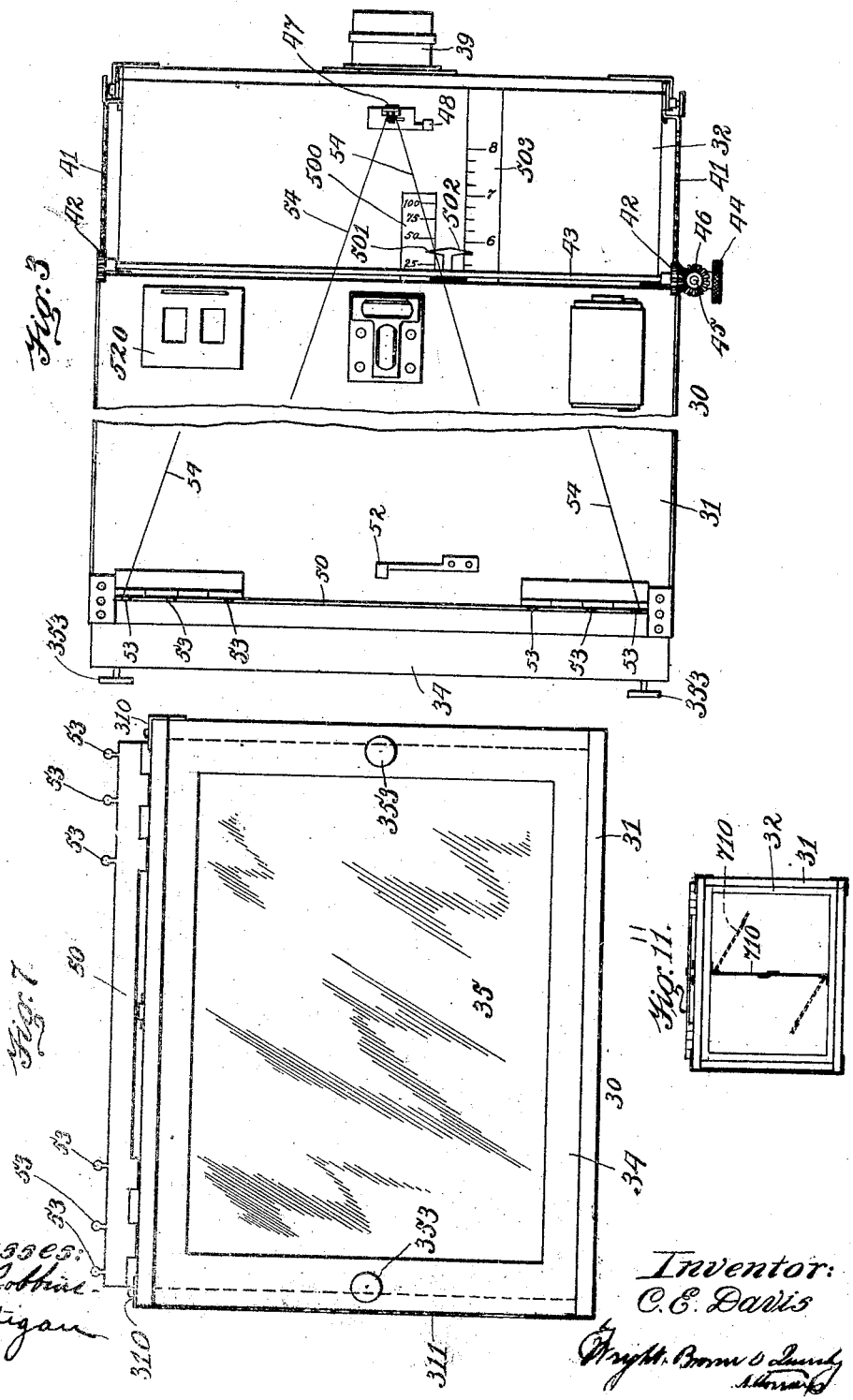

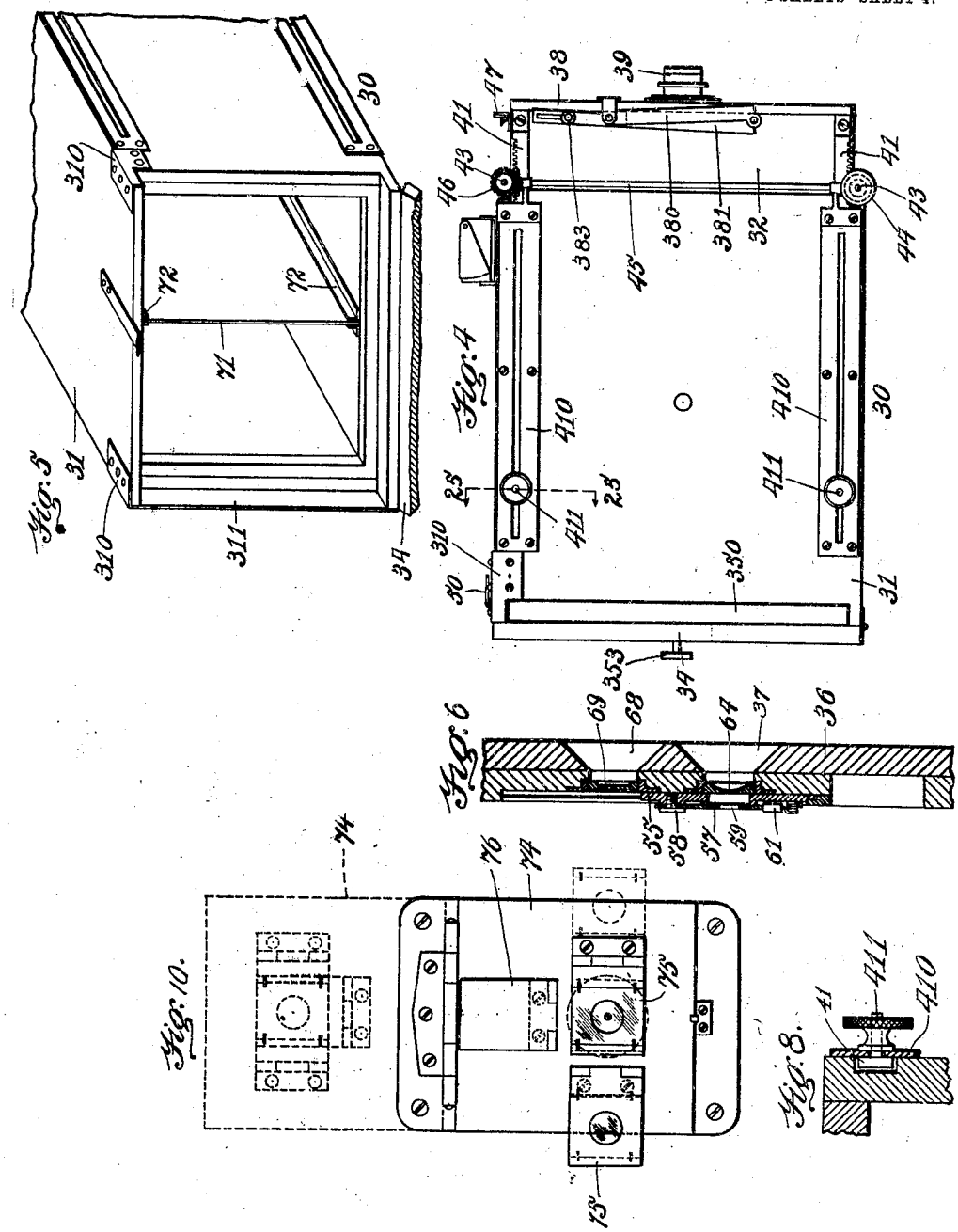

UNITED STATES PATENT OFFICE.

CHARLES E. DAVIS, OF WALTHAM, MASSACHUSETTS.

PHOTOGRAPHIC CAMERA.

No. 828,588.　　　　Specification of Letters Patent.　　　　Patented Aug. 14, 1906.

Application filed June 30, 1903. Serial No. 163,808.

*To all whom it may concern:*

Be it known that I, CHARLES E. DAVIS, of Waltham, in the county of Middlesex and State of Massachusetts, have invented certain new and useful Improvements in Photographic Cameras, of which the following is a specification.

This invention relates to a combination-camera designed to be converted from a lens to a lensless instrument, and vice versa, and also convertible from a single-picture to a multiple-picture instrument.

The object of the invention is to secure the greatest adaptability to the different services consistent with simplicity and compactness; and a further object is to specially facilitate the taking of pictures by the lensless-aperture method. To the accomplishment of these interrelated objects the different features of the invention are particularly directed, as will appear.

Of the accompanying drawings, Figure 1 represents a longitudinal section of a camera provided with my improvements, the section being taken through one of the side or stereoscopic exposure-apertures. Fig. 2 represents a front elevation. Fig. 3 represents a top plan view broken away in the middle. Fig. 4 represents a side elevation on a reduced scale. Fig. 5 represents a perspective view of the rear part of the camera with the hinged back thrown open. Fig. 6 represents a section on line 23 23 of Fig. 2. Fig. 7 represents a rear elevation of the camera. Fig. 8 represents a section on line 25 25 of Fig. 4. Fig. 9 represents a perspective view of the hinged front with its flaps raised. Fig. 10 represents a front elevation showing a modification in the structure at the front of the camera. Fig. 11 represents an elevation showing a modified form of dividing-partition for the interior of the camera.

In the drawings, 30 represents the camera-box, having an outer rear section 31, a sliding telescopic front section 32, and an inner light-excluding skin or shell 33 secured to the section 31 and fitting closely within the section 32. 34 is a hinged back frame rabbeted or recessed to receive the frame 350, holding the ground glass 35. The latter is projected forward by springs 351, so as to occupy the plane of the plate or sensitive surface when the plate-holder is absent, these springs surrounding guide-rods 352, whereby the ground glass is guided to move into and out of the rabbeted back 34. The rods have heads or finger-pieces 353 for withdrawing the frame. The frame 350 when in operative position abuts against the stop or abutment 354, carried by the outer section 31, and to which the light-excluding skin 33 is secured, as best seen in Fig. 1. This stop 354 acts not only as a stop to limit the movement of the frame 350, but also acts to exclude the light from the interior of the camera.

On the corners of the camera at the plate-holder-containing portion are reinforcing angle pieces or braces 310, one of these being continued vertically downward to form a light-stop and abutment 311 on the side of the camera opposite where the plate-holder is introduced between the edge of the frame 350 and the body of the rear camera-section.

The camera is provided with two fronts, one being a fixed front board 36, rabbeted and secured by screws 360 to a rectangular fixed frame 361 in the front of the camera, said front having a central exposure-opening 37 and side exposure-openings 370; and a hinged front 38, carrying centrally an ordinary lensed tube 39 for alinement with the central opening 37, said hinged front being also rabbeted to fit within the front of the telescopic section 32. This double rabbeted construction of the two fronts forms an effectual light-excluder.

The inner fixed front 36 carries the lensless-aperture members, as will be presently explained. The hinged member 38 is supported by two pairs of folding links 380 and 381 and is also provided with the hinged side flaps 400, one of which has a top flap 401 hinged thereto. These flaps are arranged to be folded against the inner surface 40 of the swinging front 38 when not in use, and they may be opened out, as shown in Fig. 9, with the side flaps 400 extending at right angles to the front 38 and the top flap bridging the two side flaps and secured to one of them by a fastening means 402. When thus opened out, these flaps screen the lens-opening from the sun's rays, and thus form an antifogging device which can be used when the camera is pointed in the general direction of the sun.

Any suitable focusing device may be employed. That shown is constructed as follows: Along the four edges of the telescopic section 32 are extended four racks 41, meshing with pinions 42, mounted in pairs on two horizontal shafts 43. One of these shafts, as the lower one, has a thumb head or knob 44 for rotating it, and the horizontal shafts are connected by a vertical shaft 45 and bevel-gearing 46. In this manner power is applied equally on all four corners of the telescopic section, and the latter moves easily without binding. The racks 41 operate behind slotted plates 410 and are provided with clamping devices 411, as shown in Figs. 4 and 8, for securing the telescopic section in any adjustment.

The above-described method of constructing and operating the telescopic camera-box is designed with special reference to securing a parallel moving of the front of the camera carrying the lensless-aperture member with respect to the rear part carrying the sensitive surface and is also designed with reference to securing an interior space which will properly receive the inside fittings hereinafter described.

To determine how much is included in the field defined on the sensitive surface when the lensless aperture is employed, there is mounted on top of the camera-box the following mechanism: 47 is a post or sighting-point hinged to the telescopic section 32 and coinciding with the vertical line through the crossing of the light-rays in the exposure-aperture. A spring-catch 48 holds this post in folded or inoperative position, and a spring 49 tends to project it into an outstanding or extended operative position, as shown in Fig. 2. On the rear section 31 of the camera-box and coinciding with the plane of the sensitive surface is a hinged plate or bar 50, elevated into outstanding operative position by a spring 51 and held in folded inoperative position by a spring-catch 52. Along the upper edge of this bar are located pairs of sighting-points 53, whose members are separated by distances corresponding to the widths of different sizes of sensitive surfaces or plates. By sighting toward the forward point 47 from the members of a pair of rear points 53 after the camera-box is adjusted to its proper extension the limits of the object or objects to be photographed, which will appear on the corresponding size of sensitive surface, may be determined. Sighting cords or strings 54 may be extended between the sighting-points, as indicated in Fig. 3, and if these are elastic bands they will remain in tension at different adjustments of the camera-box sections.

On top of the box, Fig. 3, is a focusing-gage composed of a scale 500 and a pointer 501 for gaging the focus of the lens in the aperture-tube 39. For lensless exposures I provide a pointer 502, fixed to the camera-section 31 on the same stem with the pointer 501, and a scale 503 on the camera-section 32, graduated in uniform units proportional to the amount of extension of the telescopic section. This device is a magnification-scale for gaging the size of the image projected through the lensless-aperture plate.

Any suitable actinograph 520 may be employed for gaging the time of exposure through the lensless aperture.

On front of the fixed board or camera-front 36 is mounted a slide 55, movable in vertical guides 56 and carrying a socket threaded to receive a lensless-aperture plate 63, having a small exposure opening or aperture 64. Hinged to swing on an axis 58 parallel to the ray-axis of the aperture-plate is a shutter-plate 57, having openings 59, adapted to be brought into register with the aperture 64. One of the holes or openings 59 is preferably left plain, as shown in Fig. 2, while the other two are covered with color-filters 60, the use of which, in connection with a no-lens aperture, has been found to minimize halation and improve color values. The shutter has a solid or plain portion between openings 59, which shuts off the access of light to the aperture-plate between exposures. A spring-projected catch 61, coöperating with notches 62, holds the shutter-plate with the different openings or the blank space thereof in register with the aperture-plate.

When the camera is employed to make lens-exposures, the slide 55 is elevated until it uncovers the opening 37, and the hinged front 38 is closed or folded into vertical position.

In the fixed front 36 above the exposure-opening 37 is an exposure-opening 68, normally closed by a flush plug 69. For high exposures with the lensless aperture the plug 69 is removed, the slide 55 elevated to coöperate with the opening 68, and the plug 69 replaced in the lower opening 37.

In addition to the central exposure-opening the fixed front 36 is shown as provided with similar side openings 370 in the middle of the two side halves of the interior of the camera-box, such side openings serving for the purpose of taking multiple or stereoscopic pictures with lensless apertures. For this purpose said openings are fitted with suitable aperture-plates, such as have been described, mounted upon shutter-slides 380, which move vertically in guides 381 and are connected by a cross-piece 382, having a finger piece or knob 383 to operate the slides in common. By moving the aperture-plates carried by said slides in line with the openings 370 exposure is made, and by moving the blank parts of the slides over the openings 370 exposure is terminated.

70 represents flaps hinged to the slides 380 above and below the aperture-plates thereon and adapted to be positioned alternatively in front of said aperture-plates, said flaps carrying color-filters of different kinds.

It will be noted that the slides 380 and their appurtenances are mounted at the bottom of a sunken panel within a U-shaped recess 390. This leaves the shutter 57 upon a protruded portion of the fixed front and enables it to swing across the slides 380.

Fig. 10 shows a substitute for the shutter 57 in the form of a flap 74, hinged to a stationary support and carrying color-filter flaps 75 and a solid or blank shutter-flap 76. When the stereoscopic or multiple-exposure-apertures are employed, the central exposure aperture of course is disused, and I divide off the interior of the camera into two side halves by a suitable device, such as the sliding partition 71, Fig. 5, mounted in guides 72. Fig. 7 shows a modification of this partition in the form of hinged flaps 710, meeting at their free edges in the middle of the camera.

I have herein illustrated and described one embodiment only of my invention.

I claim—

1. In a photographic camera of the character specified, lensed and lensless aperture members, and means for alternatively supporting the same in position to affect the sensitive surface.

2. In a photographic camera of the character specified, a camera-front having an exposure-opening and lensed and lenseless aperture members movable into and out of line therewith.

3. In a photographic camera of the character specified, a camera-body having two fronts, and lensed and lensless aperture members on the respective fronts.

4. In a photographic camera of the character specified, a camera-body having inner and outer fronts, a lensed-aperture member on the outer front, and a lensless-aperture member on the inner front movable into and out of line with the ray-axis of said lensed-aperture member.

5. In a photographic camera of the character specified, a camera-body having inner and outer movable fronts rabbeted for the exclusion of light, and lensed and lensless aperture members on the respective fronts.

6. In a photographic camera of the character specified, a camera-front having a central opening for normal exposures, an elevated opening for high exposures, and a holder for a lensless-aperture member movable into register with either of said openings.

7. In a photographic camera of the character specified, a lensless-aperture member and a color-filter movable into and out of coöperative relation with the aperture of said member.

8. In a photographic camera of the character specified, a camera-body, a movable longitudinal partition for the interior thereof permitting the employment of said interior as a whole or in parts, and a plurality of lensless-aperture members for the respective parts.

9. In a photographic camera of the character specified, a camera-body, a movable longitudinal partition for the interior thereof permitting the employment of said interior as a whole or in parts, a plurality of lensless-aperture members for the respective parts, and a central lensless-aperture member for the interior as a whole.

10. In a photographic camera of the character specified, a camera-front having a central exposure-opening, side exposure-openings, and shutters for said several openings, the shutters for the side exposure-openings being connected to move in unison, and the shutter for the central opening being independent from the other shutters.

11. In a photographic camera of the character specified, a camera-front having a central exposure-opening and side exposure-openings, sliding shutters for said side exposure-openings connected to move in unison, and an independent shutter for the central exposure-opening.

12. In a photographic camera, a camera-front having side exposure-openings and a central exposure-opening, vertically-moving shutters for the side exposure-openings, said shutters being connected to move in unison, and an independent shutter for the central exposure-opening.

13. In a photographic camera, a camera-front having side exposure-openings and a central exposure-opening, vertically-moving shutters for the side exposure-openings, said shutters being connected to move in unison, and an independent pivotally-mounted shutter for the central exposure-opening.

14. In a photographic camera of the character specified, a recessed camera-front having a protruded exposure device, side exposure devices in the recessed portion of said front, and shutter mechanism for the central device movable across said recessed portion.

15. In a photographic camera of the character specified, a lensless-aperture member, and a color-filter therefor hinged to move as a flap into and out of line with the aperture of said member.

16. In a camera of the class described, a camera-body comprising a rear section and a front section each open at one end and one section telescoping within the other, a rabbeted or recessed back hinged to the rear section, an image-receiving plate non-detachable from said back and movable into and out of the recess therein, a light-excluding stop or abutment on the rear section for limiting the movement of the plate and a light-excluding skin attached to said abutment and located within the front section.

17. In a camera adapted for lens or lensless exposures, a camera-body having sections telescoping on each other, means for supporting either a lens or a lensless aperture member in position to effect the sensitive surface, and a gage comprising a compound scale on one section of the body and an indicating member on the other section adapted to coöperate with both of the scale-sections, one section of the scale being for determining the size of the image and the other for determining the focus.

18. In a photographic camera of the character specified, a camera-body having a swinging front provided with a lensed-aperture member, and an inner front provided with a lensless-aperture member.

19. In a photographic camera of the character specified, a camera-body, a hinged front thereon, and flaps mounted to fold over said front.

20. In a photographic camera of the character specified, a camera-body, a hinged front thereon, and flaps formable into an arch over the inner side of the hinged front to form an antifogging device.

21. In a camera adapted for lens or lensless exposures, a camera-body, a hinged and rabbeted or recessed back thereon, an image-receiving plate non-detachable from said back but movable into and out of the recess of said back and means to guide said plate in its movement.

22. In a camera adapted for lens or lensless exposures, a camera-body, a frame at the rear end thereof having an image-receiving plate, guide-pins on opposite edges of said plate having projecting finger-pieces, and springs surrounding said pins and impelling said frame toward the front of the camera.

In testimony whereof I have affixed my signature in presence of two witnesses.

CHARLES E. DAVIS.

Witnesses:
A. C. RATIGAN,
C. F. BROWN.